United States Patent
Yatsuri et al.

(10) Patent No.: US 10,313,658 B2
(45) Date of Patent: *Jun. 4, 2019

(54) VEHICLE-MOUNTED STEREO CAMERA DEVICE AND METHOD FOR CORRECTING THE SAME

(71) Applicant: Panasonic Intellectual Property Management Co., Ltd., Osaka (JP)

(72) Inventors: Shigenori Yatsuri, Osaka (JP); Norikazu Yamamoto, Kyoto (JP); Mitsuru Kashihara, Osaka (JP); Yuichi Suzuki, Osaka (JP); Ken Ishida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/488,564

(22) Filed: Apr. 17, 2017

(65) Prior Publication Data

US 2017/0223341 A1    Aug. 3, 2017

Related U.S. Application Data

(63) Continuation of application No. PCT/JP2016/002834, filed on Jun. 13, 2016.

(30) Foreign Application Priority Data

Sep. 7, 2015   (JP) ................................ 2015-175289

(51) Int. Cl.
*H04N 7/00*   (2011.01)
*H04N 13/246*   (2018.01)
(Continued)

(52) U.S. Cl.
CPC ............. *H04N 13/246* (2018.05); *B60R 1/00* (2013.01); *G01B 7/003* (2013.01); *G01C 3/085* (2013.01);
(Continued)

(58) Field of Classification Search
USPC .................... 348/118, 120, 61, 42, 48, 51
See application file for complete search history.

(56) References Cited

U.S. PATENT DOCUMENTS 9,319,587 B2 * 4/2016 Takao ................ H04N 5/23274
2007/0058049 A1 * 3/2007 Kawahara .............. H04N 5/225
348/218.1
(Continued)

FOREIGN PATENT DOCUMENTS

DE    102013017341 A1    6/2014
EP    2779621 A1    9/2014
(Continued)

OTHER PUBLICATIONS

International Search Report of PCT application No. PCT/JP2016/002834 dated Aug. 23, 2016.
(Continued)

*Primary Examiner* — Daquan Zhao
(74) *Attorney, Agent, or Firm* — Renner Otto Boisselle & Sklar, LLP

(57) ABSTRACT

A vehicle-mounted stereo camera device that achieves high-precision distance detection is provided. The provided vehicle-mounted stereo camera device includes a left camera and right camera disposed on a vehicle via a holder to cause visual fields to overlap each other, a stereo processor that calculates a distance to a body outside the vehicle based on images captured by the left camera and right camera and on positions on the vehicle, first and second geomagnetic sensors respectively disposed near the left camera and right (Continued)

camera, and a third geomagnetic sensor disposed on the holder. The stereo processor compares a geomagnetic value detected by the first or second geomagnetic sensor with a geomagnetic value detected by the third geomagnetic sensor, detects a displacement amount of the left camera or right camera, and changes a cutout position in the image captured by the left camera or right camera based on the displacement amount.

2 Claims, 5 Drawing Sheets

(51) Int. Cl.
| | |
|---|---|
| B60R 1/00 | (2006.01) |
| G06T 7/73 | (2017.01) |
| G01B 7/00 | (2006.01) |
| G01C 3/08 | (2006.01) |
| G07C 5/00 | (2006.01) |
| G06T 7/593 | (2017.01) |
| H04N 13/271 | (2018.01) |
| H04N 13/239 | (2018.01) |
| H04N 13/128 | (2018.01) |
| H04N 13/296 | (2018.01) |
| H04N 13/00 | (2018.01) |

(52) U.S. Cl.
CPC .............. *G06T 7/593* (2017.01); *G06T 7/74* (2017.01); *G07C 5/006* (2013.01); *H04N 13/128* (2018.05); *H04N 13/239* (2018.05); *H04N 13/271* (2018.05); *H04N 13/296* (2018.05); *B60K 2350/106* (2013.01); *B60K 2350/2013* (2013.01); *B60R 2300/105* (2013.01); *B60R 2300/107* (2013.01); *B60R 2300/303* (2013.01); *B60R 2300/40* (2013.01); *G06T 2207/10012* (2013.01); *G06T 2207/10021* (2013.01); *G06T 2207/30252* (2013.01); *G06T 2207/30261* (2013.01); *H04N 2013/0081* (2013.01)

(56) References Cited

U.S. PATENT DOCUMENTS

| | | | | |
|---|---|---|---|---|
| 2007/0165910 | A1* | 7/2007 | Nagaoka | B60W 40/04 382/104 |
| 2008/0095402 | A1* | 4/2008 | Kochi | G01C 11/00 382/103 |
| 2008/0143835 | A1* | 6/2008 | Abe | B60R 1/00 348/148 |

FOREIGN PATENT DOCUMENTS

| | | |
|---|---|---|
| JP | 2001-233139 | 8/2001 |
| JP | 2012-029033 | 2/2012 |

OTHER PUBLICATIONS

The Extended European Search Report dated Jul. 23, 2018 for the related European Patent Application No. 16843869.5.

* cited by examiner

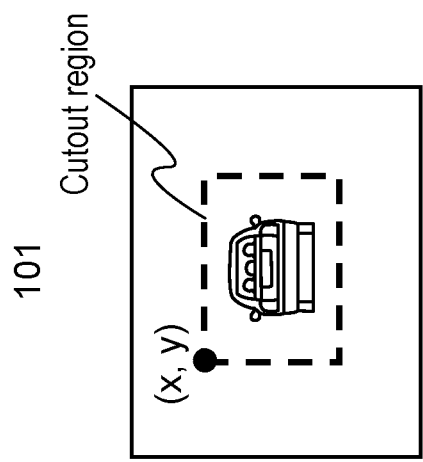
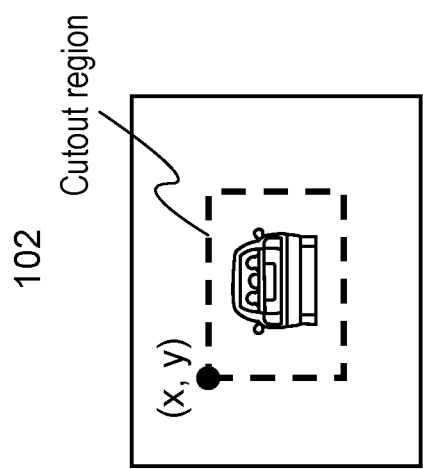
FIG. 4A
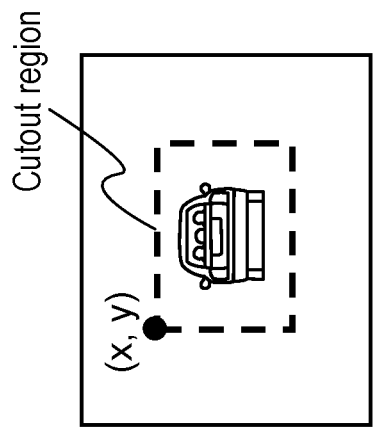
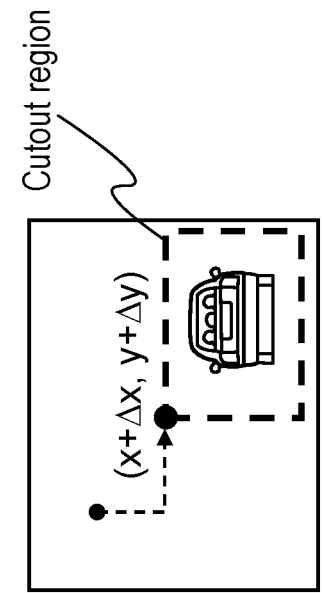
FIG. 4B

VEHICLE-MOUNTED STEREO CAMERA DEVICE AND METHOD FOR CORRECTING THE SAME

BACKGROUND

1. Technical Field

The present disclosure relates to a vehicle-mounted stereo camera device.

2. Description of the Related Art

Unexamined Japanese Patent Publication No. 2001-233139 discloses a vehicle-mounted stereo camera device having a function to adjust a positional displacement. The vehicle-mounted stereo camera device described in Unexamined Japanese Patent Publication No. 2001-233139 adjusts the positional displacement of a stereo camera based on an image obtained by capturing a fender marker.

SUMMARY

The present disclosure provides a vehicle-mounted stereo camera device capable of achieving high-precision distance detection.

The vehicle-mounted stereo camera device according to the present disclosure includes: a first image capturing unit and a second image capturing unit disposed on a vehicle via a holder to cause visual fields to overlap each other; and a controller that calculates a distance to a body outside the vehicle based on an image captured by the first image capturing unit, on an image captured by the second image capturing unit, and on positions of the first image capturing unit and the second image capturing unit on the vehicle. The vehicle-mounted stereo camera device further includes: a first geomagnetic detector disposed near the first image capturing unit; a second geomagnetic detector disposed near the second image capturing unit; and a third geomagnetic detector disposed on the holder. The controller compares a geomagnetic value detected by the first geomagnetic detector with a geomagnetic value detected by the third geomagnetic detector to detect a displacement amount of the first image capturing unit; based on the displacement amount of the first image capturing unit, the controller changes a cutout position in the image captured by the first image capturing unit. The controller compares a geomagnetic value detected by the second geomagnetic detector with a geomagnetic value detected by the third geomagnetic detector to detect a displacement amount of the second image capturing unit, and based on the displacement amount of the second image capturing unit, the controller changes a cutout position in the image captured by the second image capturing unit.

The vehicle-mounted stereo camera device according to the present disclosure can achieve high-precision distance detection.

BRIEF DESCRIPTION OF THE DRAWINGS

FIG. 4A is a diagram illustrating change processing of a cutout position according to the exemplary embodiment;

FIG. 4B is a diagram illustrating the change processing of the cutout position according to the exemplary embodiment.

DETAILED DESCRIPTION

An exemplary embodiment will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiment.

It is to be noted that the accompanying drawings and the following description are provided in order for a person skilled in the art to fully understand the present disclosure, and are not intended to limit the subject described in the appended claims.

The exemplary embodiment will be described below with reference to FIGS. 1 to 5.

Exemplary Embodiment

[Configuration of Vehicle-Mounted Stereo Camera Device]

Figure 1:
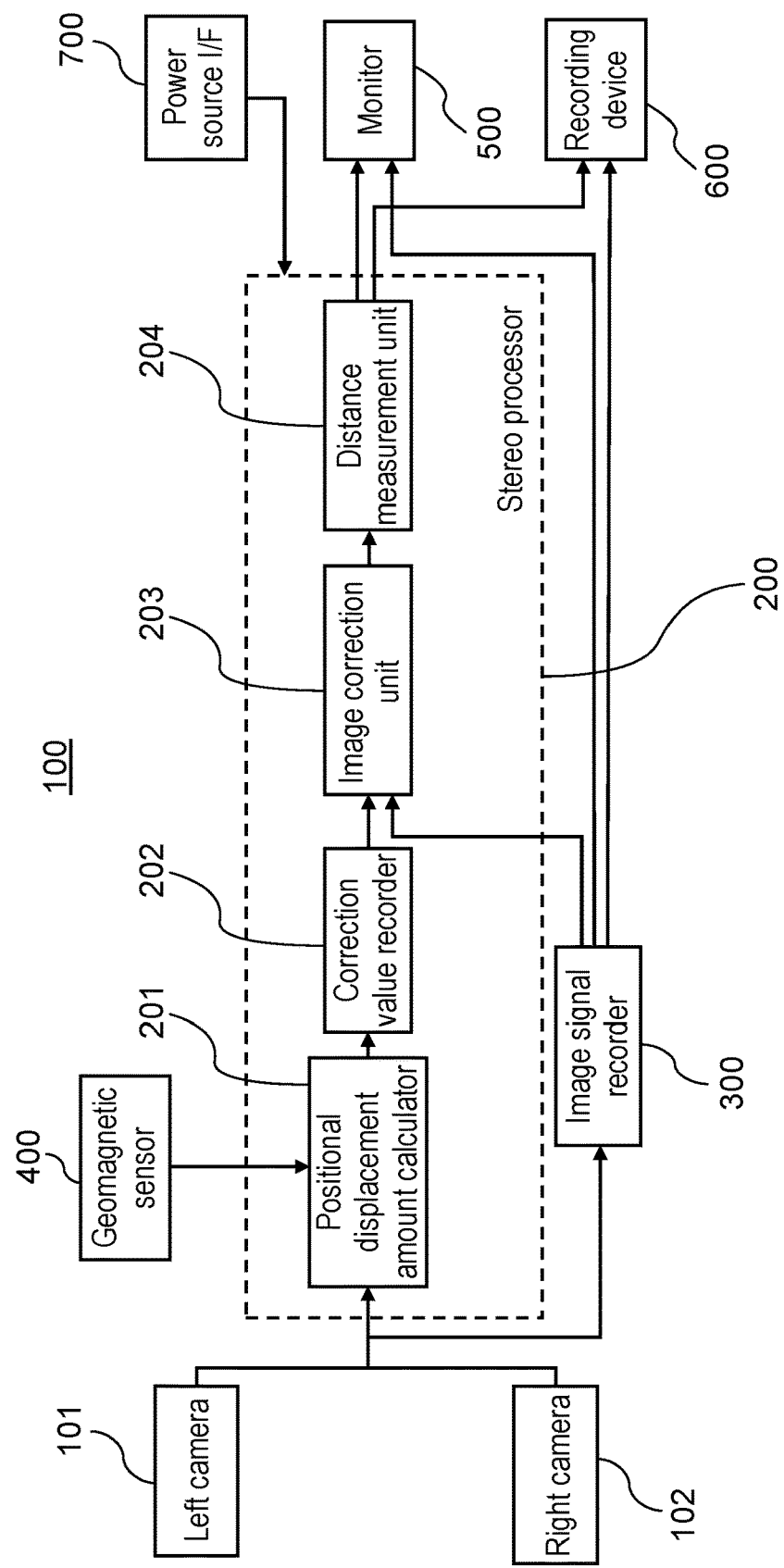
FIG. 1 is a block diagram illustrating a configuration of a vehicle-mounted stereo camera device according to the exemplary embodiment.

FIG. 1 is a block diagram illustrating a configuration of vehicle-mounted stereo camera device 100 according to the exemplary embodiment. In FIG. 1, vehicle-mounted stereo camera device 100 includes left camera (first image capturing unit) 101, right camera (second image capturing unit) 102, stereo processor (controller) 200, image signal recorder 300, geomagnetic sensors (geomagnetic detectors) 400, monitor 500, recording device 600, and power source I/F 700.

Image signals captured by left camera 101 and right camera 102 are input into stereo processor 200 and image signal recorder 300. Stereo processor 200 determines parallax from a matching level of two images by using a technique of image matching. Stereo processor 200 calculates a distance to an object to be measured that exists outside a vehicle by a principle of triangulation based on the parallax and a distance between left camera 101 and right camera 102. Geomagnetic sensors 400 acquire physical positional information about each of left camera 101 and right camera 102, and send the acquired physical positional information to stereo processor 200. The image signals captured by left camera 101 and right camera 102, and distance results calculated by stereo processor 200 are displayed on monitor 500 and are recorded in recording device 600. Power source I/F 700 supplies electricity from a cigarette lighter socket, a battery, or the like of the vehicle to each unit.

Stereo processor 200 includes positional displacement amount calculator 201 that calculates displacement amounts based on the physical positional information on left camera 101 and right camera 102 obtained from geomagnetic sensors 400, correction value recorder 202 that records the positional displacement amount, image correction unit 203 that changes cutout positions of images captured by left camera 101 and right camera 102 based on the positional displacement amount, and distance measurement unit 204 that calculates the parallax from the cutout right and left images and converts the parallax into the distance to the object to be measured.

Figure 2:
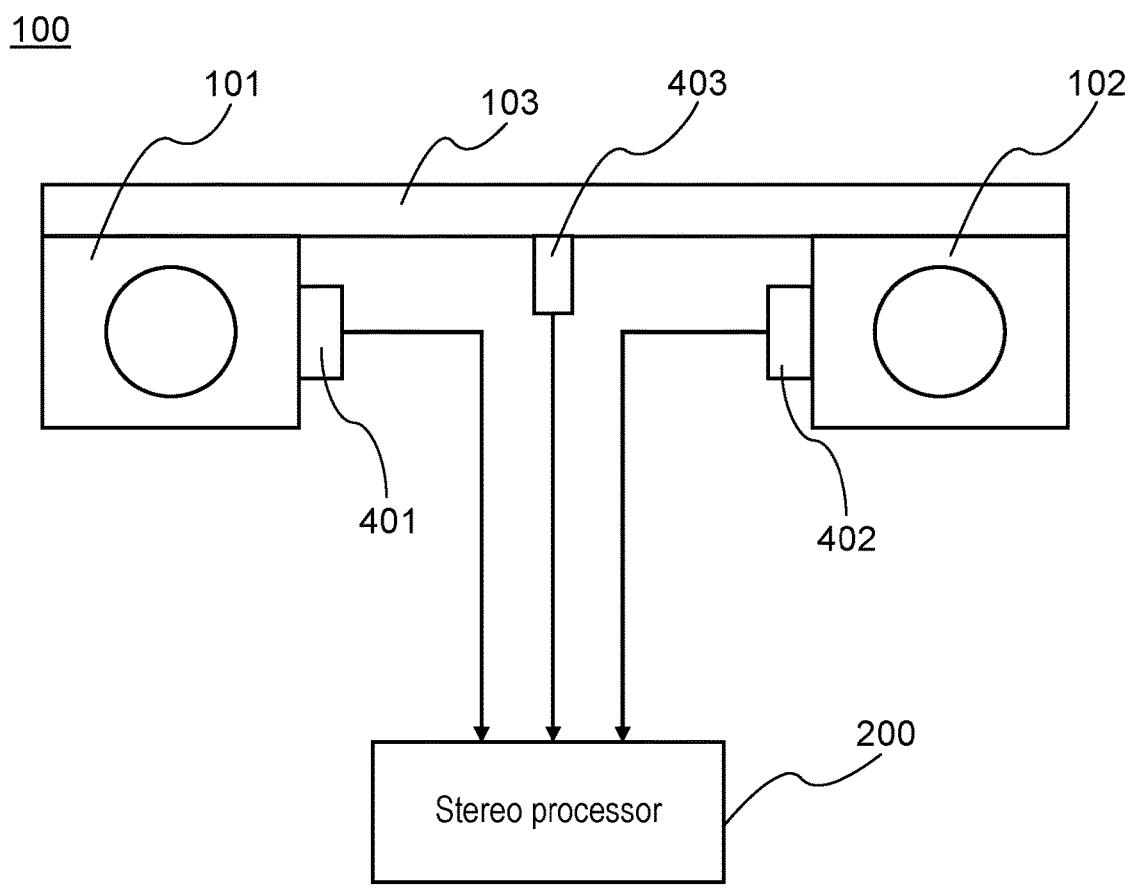
FIG. 2 is a schematic view illustrating the configuration of the vehicle-mounted stereo camera device according to the exemplary embodiment.

FIG. 2 is a schematic view illustrating the configuration of vehicle-mounted stereo camera device 100 according to the exemplary embodiment. Left camera 101 and right camera 102 are mounted inside the vehicle at a distance of a base length away via holder 103 to cause visual fields to overlap each other. Left camera 101 and right camera 102 are adjusted during manufacturing to cause optical axes to become parallel with each other. Each of left camera 101 and right camera 102 includes an imaging element, a zoom lens, a focus lens, a fixed lens, and other elements.

According to the present disclosure, in order to detect the positional displacements of the right camera and the left camera, geomagnetic sensors 400 are disposed including first geomagnetic sensor (first geomagnetic detector) 401 near left camera 101, second geomagnetic sensor (second geomagnetic detector) 402 near right camera 102, and third geomagnetic sensor (third geomagnetic detector) 403 on holder 103. Magnetic field sensors 400 acquire physical positional information on left camera 101 and right camera 102. The acquired positional information is input into stereo processor 200. Stereo processor 200 performs correction for changing the cutout positions of the images based on a change in the positional information, and then stereo processor 200 measures the distance to the object based on the corrected images.

For this reason, even if a fixation state of left camera 101 and right camera 102 is changed from a fixation state adjusted during manufacturing, causing a positional displacement, vehicle-mounted stereo camera device 100 according to the present disclosure can achieve high-precision distance measurement without errors during the distance measurement.

[Geomagnetic Sensors]

Figure 3:
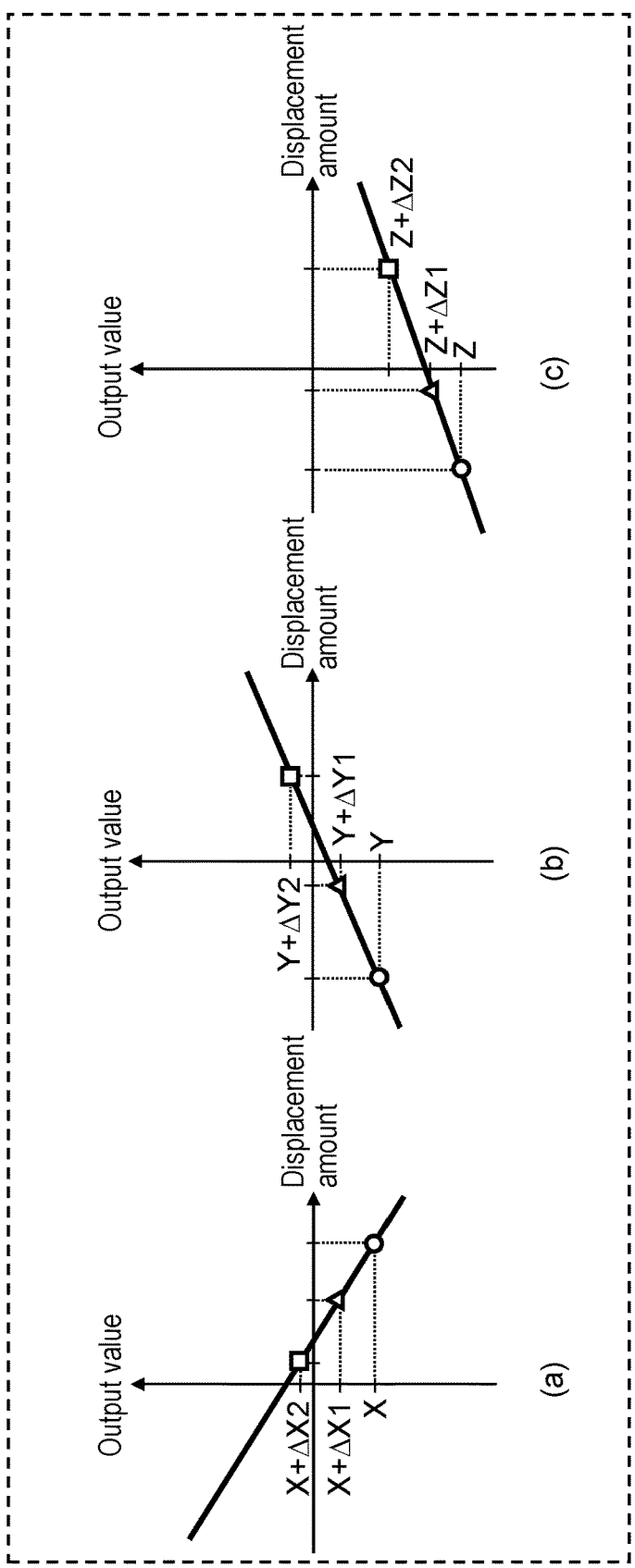
FIG. 3 shows diagrams illustrating geomagnetic sensors according to the exemplary embodiment.

FIG. 3 shows are diagrams illustrating geomagnetic sensors 400 according to the exemplary embodiment. Geomagnetic sensors 400 detect a direction of geomagnetism and calculate a bearing. Accordingly, output values obtained from geomagnetic sensors 400 change depending on in which direction geomagnetic sensors 400 are installed. Here, as illustrated in FIG. 3(*a*), FIG. 3(*b*), and FIG. 3(*c*), the output values are obtained including an X component, a Y component, and a Z component, respectively.

In an initial state, all the three geomagnetic sensors are installed in an identical direction in a manufacturing stage, including first geomagnetic sensor 401 attached to a lens of left camera 101, second geomagnetic sensor 402 attached to a lens of right camera 102, and third geomagnetic sensor 403 attached to holder 103. Accordingly, an identical output value is obtained from first geomagnetic sensor 401, second geomagnetic sensor 402, and third geomagnetic sensor 403.

Meanwhile, in an aging state, while holder 103 is not displaced because of its installation fixed to a vehicle body, the lenses of left camera 101 and right camera 102 cannot keep their initial positions and are displaced. This leads to different sensor directions between third geomagnetic sensor 403 attached to holder 103, and first geomagnetic sensor 401 and second geomagnetic sensor 402 respectively attached to the lenses of left camera 101 and right camera 102, and thus geomagnetic values obtained also change.

The output value of third geomagnetic sensor 403 attached to holder 103 is defined as (X, Y, Z); positional displacement amount calculator 201 records this value as a reference value. Meanwhile, the output values of first geomagnetic sensor 401 and second geomagnetic sensor 402 attached to the lenses of left camera 101 and right camera 102 change to (X+ΔX1, Y+ΔY1, Z+ΔZ1) and (X+ΔX2, Y+ΔY2, Z+ΔZ2), respectively. Positional displacement amount calculator 201 records these values and calculates the amounts of change (ΔX1, ΔY1, ΔZ1) and (ΔX2, ΔY2, ΔZ2) with respect to the reference value (X, Y, Z). Then, from a relationship between the amounts of change in the output values of geomagnetic sensors 400 and the amounts of change in the camera positions, which is prepared as correction data in advance as illustrated in FIG. 3, positional displacement amount calculator 201 calculates the positional displacement amounts of the cameras corresponding to the amounts of change in the output values (ΔX1, ΔY1, ΔZ1) and (ΔX2, ΔY2, ΔZ2) of first geomagnetic sensor 401 and second geomagnetic sensor 402, respectively. Positional displacement amount calculator 201 then inputs the positional displacement amounts into correction value recorder 202. Furthermore, image correction unit 203 performs image correction for changing the cutout positions by values that are input into correction value recorder 202, and then distance measurement unit 204 performs distance measurement. Thus, correcting the positional displacements of the cameras enables high-precision distance measurement equivalent to distance measurement performed when the cameras are at initial positions.

[Image Cutout Position Change Processing]

FIG. 4A and FIG. 4B are diagrams illustrating change processing of the cutout position according to the exemplary embodiment. That is, FIG. 4A and FIG. 4B are diagrams illustrating processing to be performed by image correction unit 203 by using the images in the initial state and the aging state acquired by left camera 101 and right camera 102.

As illustrated in FIG. 4A, in the initial state, image correction unit 203 cuts out an image having a certain region from a predetermined position (x, y), and then inputs the cutout image into distance measurement unit 204 for distance measurement.

Next, FIG. 4B illustrates processing in the aging state. Here, consider one example in which positional displacement occurs only in right camera 102. Among the image signals captured by left camera 101 and right camera 102, image correction unit 203 changes the cutout position of the image signal captured by displaced right camera 102 to the position (x+Δx, y+Δy) obtained by performing parallel translation of a correction value (Δx, Δy) corresponding to the positional displacement amount detected by second geomagnetic sensor 402. Then, image correction unit 203 cuts out an image having a certain region from the position and inputs the image into distance measurement unit 204. Accordingly, distance measurement unit 204 receives the image of a range identical to a cutout range in the initial state, and performing image matching within the cutout range enables accurate distance measurement without any change from the initial state.

[Calibration Processing]

Figure 5:
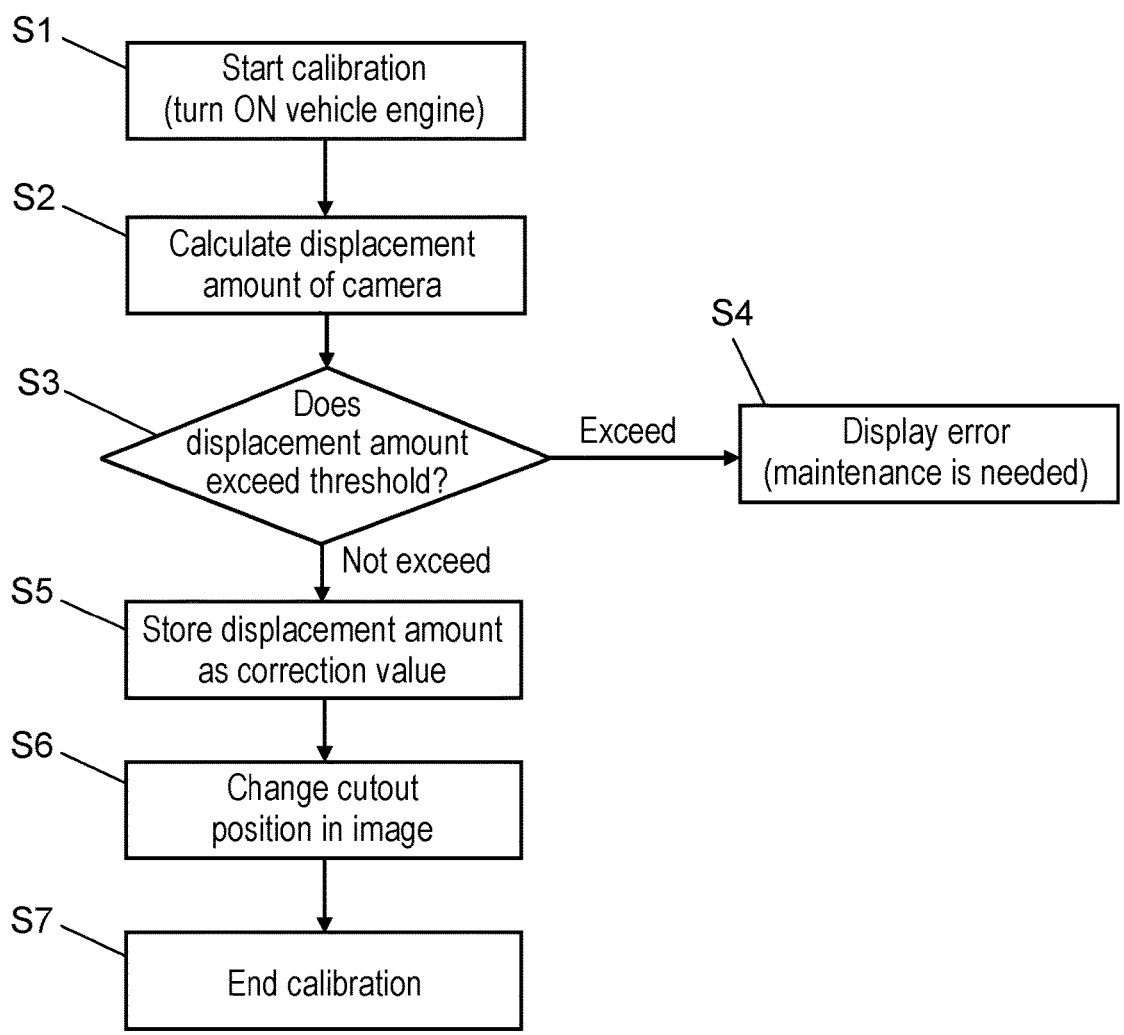
FIG. 5 is a flowchart illustrating calibration processing according to the exemplary embodiment.

FIG. 5 is a flowchart illustrating calibration processing of vehicle-mounted stereo camera device 100. When a driver starts an engine of a vehicle, image signals captured by left camera 101 and right camera 102 are input into stereo processor 200, and then calibration processing starts (S1). Positional displacement amount calculator 201 of stereo processor 200 calculates the physical displacement amounts of the cameras (S2). A certain threshold is provided in advance for the displacement amounts calculated here, and stereo processor 200 determines whether at least one of the displacement amounts exceeds the threshold (S3). When the at least one of the displacement amounts exceeds the threshold, stereo processor 200 causes monitor 500 to display an error and notifies the driver that maintenance is needed (S4).

On the other hand, when none of the displacement amounts exceeds the threshold, stereo processor 200 stores the displacement amounts in correction value recorder 202 as the correction values (S5). Image correction unit 203 then changes the cutout position by a number of pixels corresponding to each correction value in each image captured by each of left camera 101 and right camera 102 (S6). Distance measurement unit 204 receives the cutout right and left images to perform distance measurement. Thus, the calibration ends (S7). Performing this processing every time the user starts the engine of the vehicle always enables accurate distance measurement.

Other Exemplary Embodiments

As described above, the exemplary embodiment has been described as illustration of the technology to be disclosed in this application. The technology in the present disclosure however is not limited to this exemplary embodiment, and may be applied to exemplary embodiments to which changes, replacements, additions, and omissions have been made. It is also possible to make a new exemplary embodiment by combining components described in the aforementioned exemplary embodiment.

In [Calibration processing] of the exemplary embodiment, every time calculating the displacement amounts in S2, stereo processor 200 determines whether the displacement amounts exceed the threshold. However, it is also possible to record the displacement amounts multiple times and to determine whether the displacement amounts exceed the threshold by using an average of the displacement amounts or the like. It is also possible to change the cutout position based on the average of the displacement amounts recorded multiple times, or the like.

Note that since the aforementioned exemplary embodiment is intended to illustrate the technology in the present disclosure, various changes, replacements, additions, omissions, and the like may be made within the scope of the appended claims or equivalents thereof.

The present disclosure can be applied to the vehicle-mounted stereo camera device.

What is claimed is:

1. A vehicle-mounted stereo camera device comprising:
   a first image capturing unit and a second image capturing unit disposed on a vehicle via a holder to cause visual fields to overlap each other;
   a controller that calculates a distance to a body outside the vehicle based on an image captured by the first image capturing unit, on an image captured by the second image capturing unit, and on positions of the first image capturing unit and the second image capturing unit on the vehicle;
   a first geomagnetic detector disposed near the first image capturing unit;
   a second geomagnetic detector disposed near the second image capturing unit; and
   a third geomagnetic detector disposed on the holder,
   wherein the controller compares a geomagnetic value detected by the first geomagnetic detector with a geomagnetic value detected by the third geomagnetic detector to detect a displacement amount of the first image capturing unit, and based on the displacement amount of the first image capturing unit, the controller changes a cutout position in the image captured by the first image capturing unit, and
   the controller compares a geomagnetic value detected by the second geomagnetic detector with the geomagnetic value detected by the third geomagnetic detector to detect a displacement amount of the second image capturing unit, and based on the displacement amount of the second image capturing unit, the controller changes a cutout position in the image captured by the second image capturing unit.

2. The vehicle-mounted stereo camera device according to claim 1, wherein the controller:
   calculates and stores the displacement amounts every time electric power is applied to the vehicle;
   calculates an average of the displacement amounts when a number of times of electric power application reaches a predetermined number; and
   changes the cutout positions based on the average of the displacement amounts.

* * * * *